United States Patent

Maurice

[15] 3,664,469
[45] May 23, 1972

[54] MECHANICALLY-OPERATED DISC-BRAKE

[72] Inventor: Jean Maurice, Paris, France

[73] Assignee: Societe Anonyme Francaise du Ferodo, Paris, France

[22] Filed: Dec. 29, 1969

[21] Appl. No.: 888,355

[30] Foreign Application Priority Data

Dec. 31, 1968 France.................................812404

[52] U.S. Cl..........................188/72.9, 188/71.1, 188/73.5
[51] Int. Cl.......................................................F16d 55/224
[58] Field of Search.....................188/72.6, 72.9, 72.8, 73.3, 188/73.5, 205.3, 71.1

[56] References Cited

UNITED STATES PATENTS

| 3,442,354 | 5/1969 | Belart | 188/73.3 X |
| 3,162,272 | 12/1964 | Gancel | 188/73.3 |

FOREIGN PATENTS OR APPLICATIONS

| 1,345,151 | 10/1963 | France | 188/72.6 |
| 1,344,416 | 10/1963 | France | 188/72.9 |

OTHER PUBLICATIONS 1,201,630 9/1965 German Printed Application Beuchle

Primary Examiner—George E. A. Halvosa
Attorney—Young & Thompson

[57] ABSTRACT

A mechanically operated disc-brake of the kind comprising a disc fast for rotation with the member to be braked, a fixed support, two brake shoes disposed one on each side of said disc and slidably mounted in housings formed in said fixed support, an operating lever adapted to co-operate with one of said shoes through a cam surface, and a transfer member on which said lever is articulated and which transmits to the second said shoe the braking action applied by said operating lever on the first shoe, in which said transfer member is coupled to the fixed support of the brake by an elastic blade which permits a rocking movement of said member with respect to said fixed support.

4 Claims, 3 Drawing Figures

MECHANICALLY-OPERATED DISC-BRAKE

The present invention relates to a disc-brake with mechanical operation.

It may relate equally well to a brake intended to equip an automobile vehicle in order to serve as a hand-brake independently of the usual hydraulically operated brakes of this vehicle, as to a brake intended to form itself the sole braking member of a light automobile vehicle for example, such as a cyclomotor, motor-bicycle or light motor-cycle, or alternatively, in a more general sense, of any rotating element to be braked or immobilized.

The present invention is more precisely directed to a mechanically operated disc-brake of the kind comprising a disc rigidly fixed for rotation to the member to be braked, a fixed support, two brake shoes arranged one on each side of the disc and slidably mounted in housings formed in the said fixed support, a control lever co-operating with one of the shoes by means of a cam surface, and a transfer member on which the said lever is articulated and which transmits to the second shoe the braking action applied by the control lever on the first shoe.

When the control lever is pivotally actuated about its axis, and due to the fact that it bears on one shoe through a cam surface, this shoe is applied against the disc to be braked, and the braking force corresponding is transmitted by the transfer member to the other shoe. This latter then becomes applied in its turn against the disc and the latter is braked by being thus gripped between the two shoes.

In the mechanically operated brakes of this type known at the present time, the transfer member is coupled to the fixed support by guiding means which only permit the single movement of translation perpendicular to the disc, necessary for the transmission of the braking force.

In consequence, friction between the cam surface of the control lever and the shoe on which it bears adversely affects the efficiency of the brake, that is to say the ratio of the braking force with respect to the operating force.

The present invention has for its object a mechanically operated disc-brake which is free from this disadvantage.

This brake, which is of the kind comprising a disc rigidly fixed for rotation to the member to be braked, a fixed support, two brake shoes arranged one on each side of the disc and slidably mounted in housings formed in the said fixed support, a control lever bearing on one of the shoes by a cam surface, and a transfer member on which the said lever is articulated and which transmits to the second shoe the braking action applied by the control lever on the first shoe, is characterized in that the said transfer member is coupled to the fixed support by elastic coupling means which permit it to rock about an axis parallel to the pivotal axis of the control lever on the said transfer member.

By this means, during a braking action, a brake of this kind has two successive stages of operation: in a first stage there is a gripping action of the brake, following a process identical with that of the usual brakes of this kind, the friction force between the control lever and the transfer member remaining less than the force necessary for rocking this member; then in a second stage and if the pivotal action applied on the control lever is maintained, the friction force becoming greater, there takes place a rocking movement of the transfer member and the elements which it carries, and in particular of the control lever, about the fixed support.

In this rocking movement, the control lever rolls on the associated shoe, along its cam surface, without thereby ceasing to apply its braking action.

The arrangement according to the invention thus leads to the obtaining of a brake having an efficiency which is definitely higher than that of the usual comparable brakes.

The characteristic features and advantages of the invention will furthermore be brought out in the description which follows below, given by way of example with reference to the accompanying drawings, in which.

Figure 1:
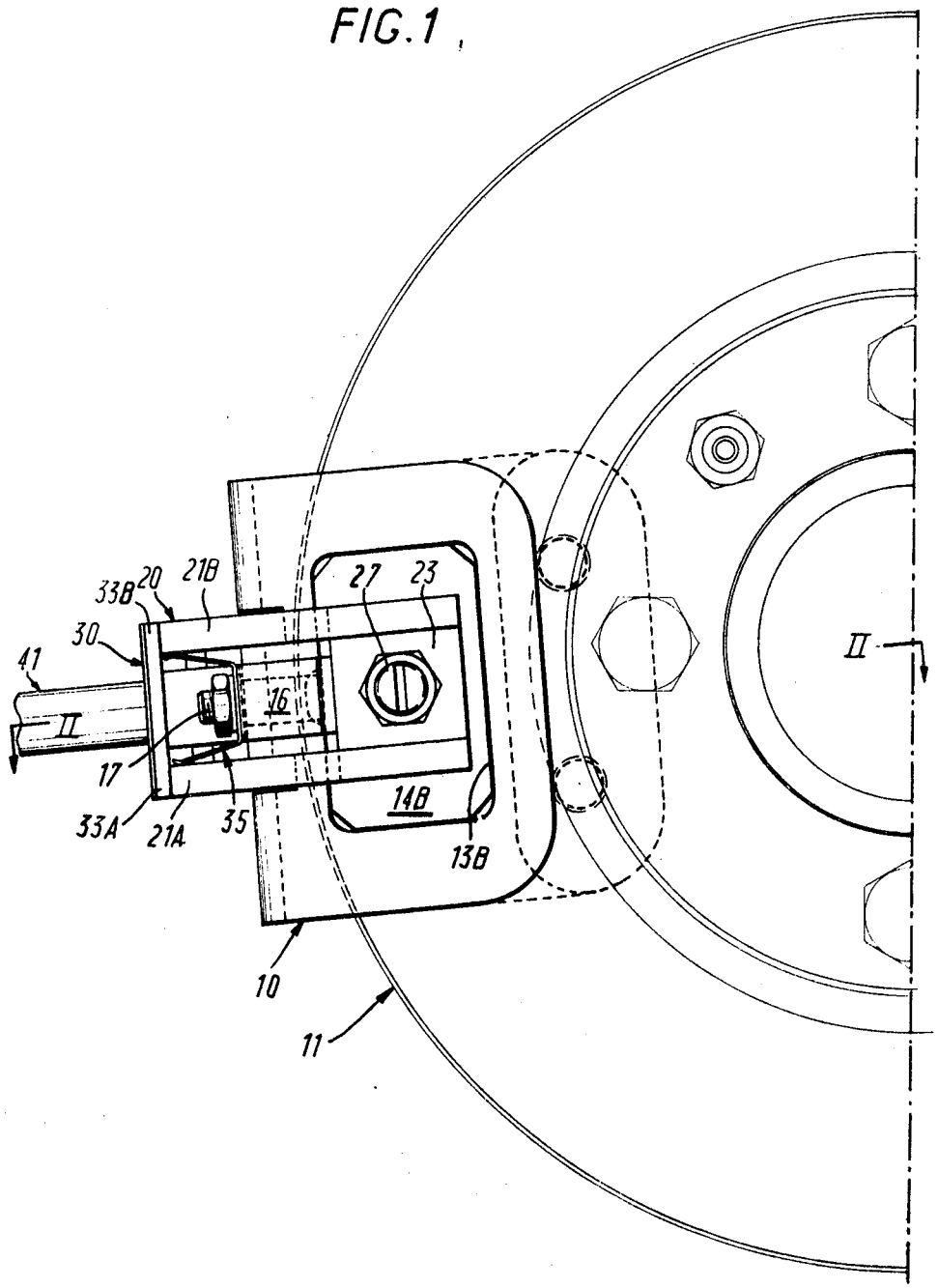
FIG. 1 is a view in elevation of the brake according to the invention.

In accordance with the form of construction shown, the brake according to the invention comprises a fixed support 10 in the form of a U, which is engaged on each side of the disc 11 to be braked, and which is fixed, for example by bolting, to a fixed element 12 which surrounds the axis of the disc.

The support 10 has two windows 13A, 13B on each side of the disc 11, in which windows the brake-shoes 14A, 14B respectively are slidably mounted.

The support 10 further carries, on the outer face of its central sole-plate 15, an elastically deformable blade 16 fixed on this sole-plate by a bolt 17.

This blade 16 is of U-shape and the extremities 18A, 18B of its arms, bent back towards each other, penetrate into notches 19A, 19B on the edge of the windows 13A, 13B, and are each in contact with a brake-shoe 14A, 14B.

This blade 16 contributes to the silent operation of the unit by preventing possible vibration of the brake-shoes.

With the support 10, is associated a transfer member which, according to the form of construction shown, is a stirrup 20 engaged radially on the disc 11, on each side of the support 10.

This stirrup 20 is composed of two parallel end-plates 21A, 21B in the form of a U, connected together at one of their extremities by a shaft 22 and at the other of their extremities by a cross-member 23.

On the shaft 22 is rotatably mounted a control lever 24 which is in contact with the shoe 14 by a curved cam surface 25, the profile of which is, for example, a circle eccentric with respect to the shaft 22.

The cross-member 23 is provided, perpendicularly to the disc 11 with a threaded bore 26 in which is engaged an adjusting screw 27, this screw bearing on the shoe 14B by its end surface 28. This end surface 28 is preferably convex.

The stirrup 20 is coupled to the support 10 by an elastic blade 30 arranged between the end-plates of the said stirrup. This elastic blade 30 is fixed at its central portion to the support 10 by the bolt 17 and is provided, on each side of this central zone, with an arm 31 supported against the cross-member 23 of the stirrup 20, and an arm 32 terminating in lateral wings 33A, 33B supported against the end-plates 21A, 21B of the stirrup 20, along the edges of the said end-plates.

Between these end-plates is also arranged a further elastically deformable blade 35 in the shape of a U, which is fixed by its base to the support 10 by the bolt 17, and the wings of which are in contact with the said end-plates, for elastic restriction and therefore silencing of the vibrations of the stirrup 20.

The end-plate 21A of the stirrup 20 further carries a stud 38 acting as an abutment for the control lever 24 when at rest.

At the free extremity of this control lever is connected a traction cable 40 which can be inserted into a protection sheath 41 and which, at its other extremity is in turn coupled to a control (not shown).

This protecting sheath 41 is supported, at one of its extremities (not shown in the drawings), by the frame of the brake equipment, and at its other extremity by a core 42 carried by a frame 43 fixed by its feet 44A, 44B on the fixed support 10.

Between this core 42 and the operating lever 24 is interposed a return spring 45 protected by a dust sheath 46.

Figure 2:
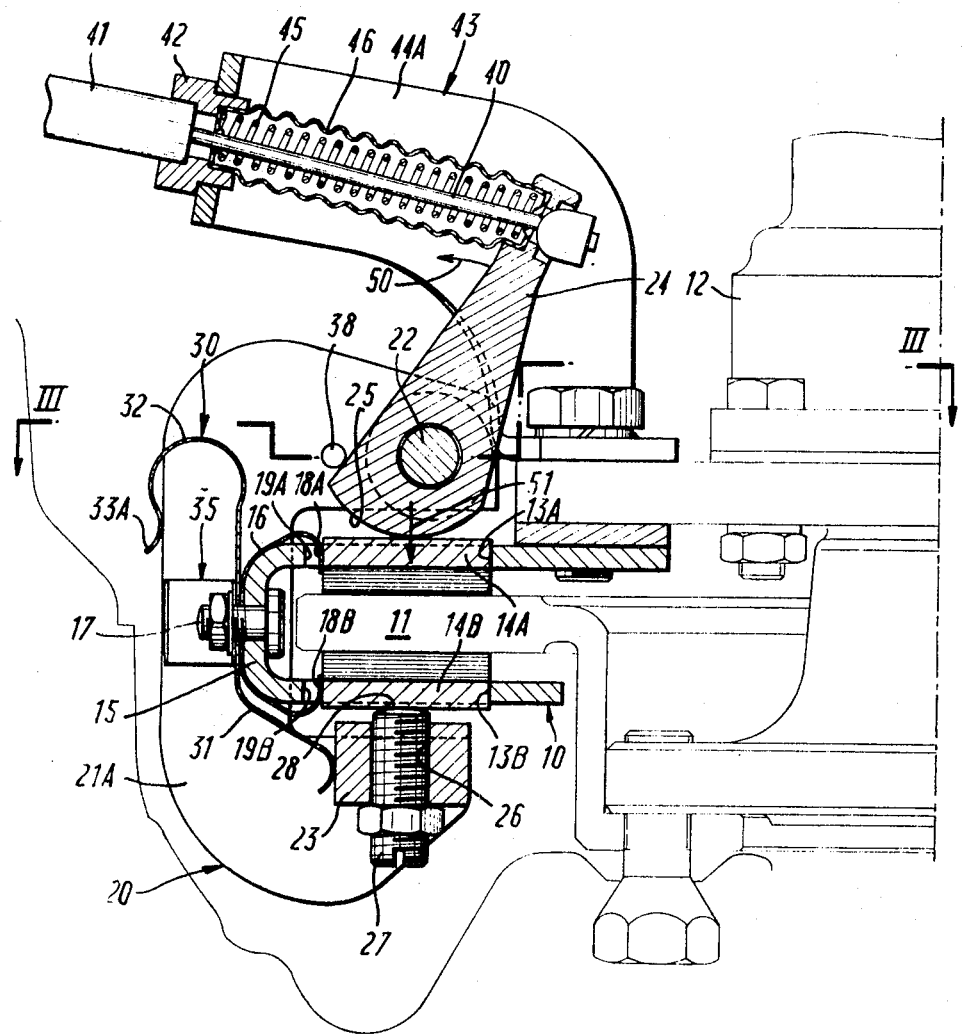
FIG. 2 is a view of this brake in cross section, taken along the line II—II of FIG. 1.
Figure 3:
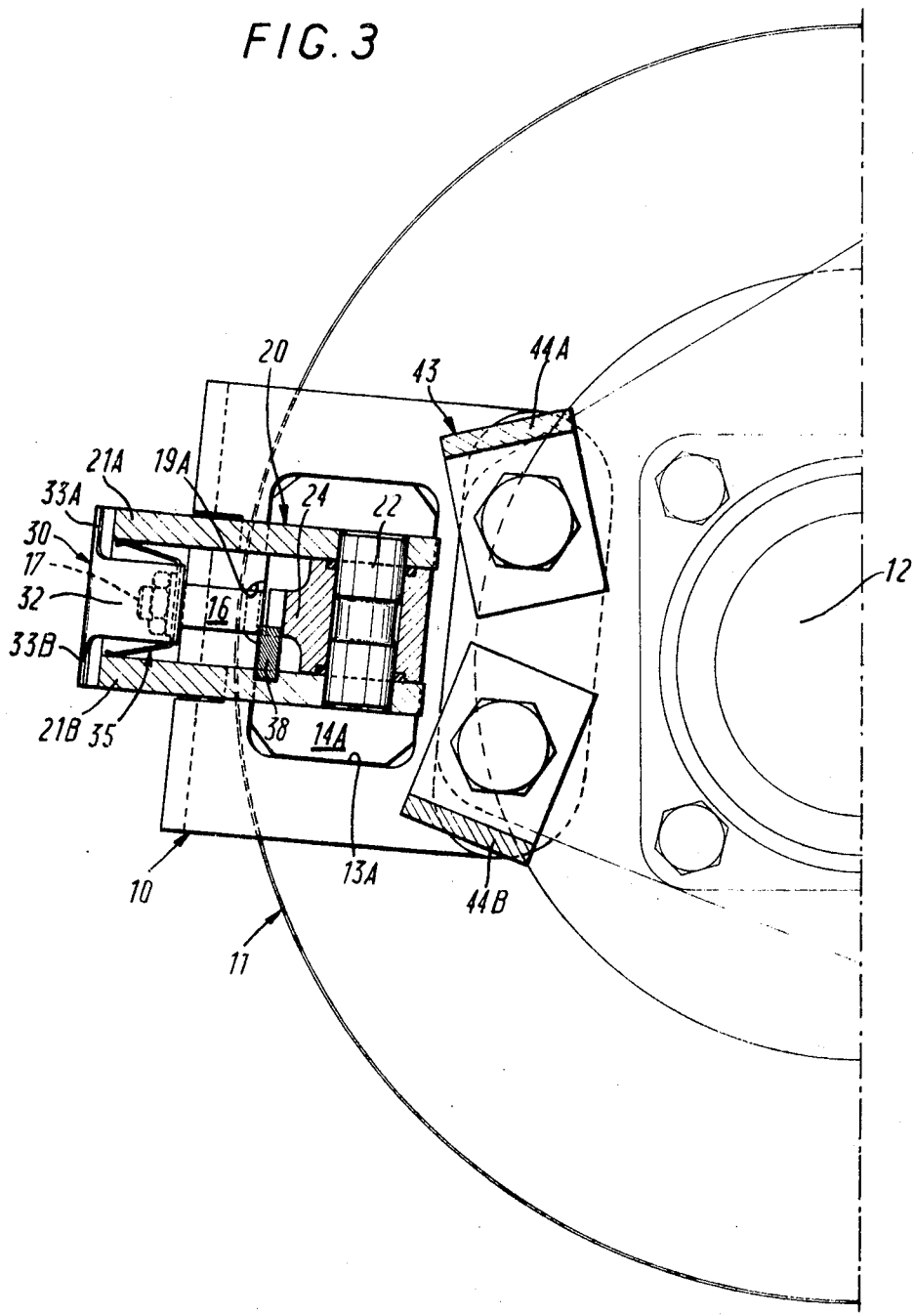
FIG. 3 is another view of this brake in cross section, taken along the broken line III—III of FIG. 2.

The operation of a brake of this kind is as follows:

During braking, a tractive force is applied on the cable 40 which, in a first stage, causes the lever 24 to pivot about its shaft 22 in the direction of the arrow 50 of FIG. 2.

Due to this pivotal movement and to its eccentric cam surface 25, the lever 24 applies a thrust to the shoe 14A in the direction of the arrow 51. The shoe 14A is then applied against the disc 11 and at the same time, the stirrup 20 transmits by reaction an opposite thrust to the shoe 14B, which also becomes applied against the disc 11.

After this approach travel, and if the traction pull on the cable 40 is continued, the disc 11 is gripped between the shoes 14A and 14B; it is thus braked. During this braking, the lever 24 begins to roll by its cam surface 25 on the shoe, this rolling movement being only rendered possible by the elastic mounting of the stirrup 20 on the support 10, according to the invention.

In fact, during this rolling action, the stirrup 20 rocks with respect to the support 10 against the force of the elastic blade 30. This rocking movement takes place about an instantaneous pivotal axis parallel to the shaft 22 of the lever 24 and passing through the contact zone of the adjustable stop 27 of the stirrup 20 on the shoe 14B, the stop or screw 27 being preferably provided for that purpose with a convex surface 28.

By virtue of this rocking movement, there is no friction between the cam surface 25 of the lever 24 and the shoe 14A, and the efficiency of the brake is thereby considerably improved.

In order to prevent jamming of the control lever 24, a stop is provided for this latter.

In the example shown, this stop is effected by the spring 45 when the turns of this latter become forced together.

When the tractive force on the cable 40 is released, the lever 24 returns to its initial position under the effect of the spring 45, the stirrup 20 returns to its initial position by the action of the springs 45 and 30, and the disc 11 is released.

As will have been observed, it is the fixed support 10 which alone absorbs the reaction due to the braking torque, the stirrup 20 only having to absorb the braking force. This definite separation of the functions carried out by these two members results in an advantageous simplification of the members.

With regard to the screw 27, in addition to the part which it plays in the rocking movement of the stirrup, it permits adjustment of the braking travel of the shoes and therefore the taking-up of play due to the wear of the shoes.

In order to change the brake-shoes, it is only necessary to remove the screw 17, which enables the stirrup 20 to be removed and thus gives access to the shoes.

In the drawings, the operating lever 24 is shown as solid. According to an alternative form of construction (not shown), this operating lever is of pressed steet sheet, suitably cut-out and bent.

The present invention is of course not limited to the form of construction described and shown, but includes any alternative form of construction.

What we claim is

1. A mechanically operable disc brake comprising a disc mounted for rotation with a member to be braked, a brake shoe arranged on each side of said disc and slidably mounted in a fixed support, an operating lever bearing directly against one of the brake shoes and pivotally mounted on a force transmission member for rotation about an axis, resilient means rockably mounting said force transmission member about an axis parallel to the pivot axis of the operating lever, said resilient means comprising a spring mounted at its central portion to said fixed support and having two arms each extending from said central portion on each side of said central portion and engaging said force transmission member at locations spaced from said central portion.

2. A disc brake as claimed in claim 1, said force transmission member comprising a pair of plates, and a U-shaped leaf spring also disposed between said plates and fixed at its base to said fixed support, said U-shaped spring having resilient arms in contact with said plates.

3. A disc brake as claimed in claim 2, an another U-shaped leaf spring arranged between said plates, said another spring being fixed at its base to said fixed support, and resilient arms incurved towards each other, each of said arms engaging a brake shoe along the edge of the shoe remote from the axis of said disc.

4. A disc brake as claimed in claim 3, the three leaf springs being secured to the fixed support by a single bolt.

* * * * *